UPGRADING OF LATERITIC ORES

Wilhelm Thumm and Günter Heitmann, Frankfurt am Main, Germany, assignors, by mesne assignments, to The International Nickel Company, Inc., New York, N.Y.
No Drawing. Filed Mar. 29, 1966, Ser. No. 538,243
Claims priority, application Germany, Apr. 7, 1965, M 64,802
14 Claims. (Cl. 241—23)

The present invention relates to the concentration of nickel values in lateritic ores and more particularly to a process in which nickel values in lateritic ores are concentrated in a metallic concentrate which contains at least about 8% metallic nickel.

Nickel-containing lateritic ores are now processed for nickel recovery. These ores are generally characterized by nickel contents of less than about 3%, by iron contents of about 10% to about 50%, and by silica and magnesia contents varying from a few percent up to about 35% in inverse ratio to the iron content.

The nickel values contained in lateritic ores are generally present in a highly dispersed state throughout the mineral structure. Since the nickel values are chemically disseminated throughout the ore, conventional concentration means such as flotation or magnetic separation without prior treatment are impractical. Some upgrading of silicate type ores is possible by removing less weathered low nickel content fractions. However, the improvement thus obtained is relatively small. Known processes for concentrating nickel values in lateritic ores which require hydrometallurgical reagents such as sulfuric acid or ammonia are economically limited in practice since the capital and operating costs are high because of the necessity of treating the whole ore. Although numerous processes have been proposed and/or attempted none, as far as we are aware, has been completely successful in overcoming the abovementioned disadvantages.

A process for concentrating nickel values contained in lateritic ores has now been discovered. In accordance with the invention a ferronickel concentrate containing at least 8% nickel, and advantageously about 15% nickel, is obtained with nickel recoveries from the ore exceeding 80%, e.g., 90%.

It is an object of the present invention to provide an economical process for concentrating the nickel values contained in lateritic ores.

Another object of the invention is to provide a concentrated metallic product of iron and nickel which contains at least 8% nickel from a lateritic ore.

Other objects and advantages will become apparent from the following description.

Broadly stated, the present invention comprises the treatment of a nickel-containing lateritic ore to concentrate and recover the nickel content thereof by subjecting the ore to a controlled reduction at elevated temperatures in the presence of controlled amounts of special agents to reduce to metal substantially all the nickel contained therein while reducing only a controlled portion of the iron and then subjecting the reduced material to magnetic separation to obtain a metallic concentrate. The controlled reduction is achieved by grinding the lateritic ore to a particle fineness of at least about 50% minus 40 microns, pelletizing the finely-divided ore to form green pellets, establishing a tumbling bed of the pellets in a rotating reactor and reducing the nickel and iron values thereof in the copresence of concentrating amounts of a sulfur-bearing material together with a metal agent from the group consisting of alkali and alkaline earth metals at a temperature of about 850° C. to about 1250° C., e.g., about 950° C. to about 1150° C., to metallize the ore so that the ratio of metallic iron to metallic nickel is less than about 10:1. The reduced pellets are cooled without reoxidizing the metallic nickel values and are finely ground. The nickel values are then recovered by magnetic separation to obtain a concentrate containing at least about 8% nickel and which contains at least about 80% of the nickel originally present in the ore.

Effective concentration of the nickel values contained in lateritic ores at practical operating reduction temperatures, having regard for the softening point of the ores in reasonable periods of time, requires intimate admixture of the ore and the concentrating reagents, e.g., sulfur-bearing material together with at least one reagent from the group consisting of alkali and alkaline earth metals. The term "alkaline earth metals" as used herein includes magnesium. Intimate admixture can be assured by grinding the ore to pelletizing fineness, e.g., at least about 50% less than 40 microns and advantageously about 100% less than 100 microns, and incorporating the concentrating reagents in the pelletized ore. The concentrating reagents can be admixed with the ore prior to pelletizing either as a solid or as a solution or can be incorporated in the pelletized ore by impregnating the pelletized ore with a solution of the concentrating reagents. The amount of the concentrating reagents employed is about 1% to about 7% of the dry ore of sodium oxide ($Na_2O$) or corresponding molar quantities of calcium oxide (CaO), potassium oxide ($K_2O$), etc., and the sulfur additive is adjusted to a ratio of sulfur to sodium oxide of from about 1:1 to about 1:4, i.e., about 0.25 to about 1 part of sulfur for each molar equivalent of sodium oxide or of other alkali and alkaline earth metals converted to the stoichiometric equivalent of $Na_2O$. Substances which contain both alkali metals or alkaline earth metals as well as sulfur are advantageously employed, e.g., $Na_2SO_4$, $Na_2S$, $Na_2SO_3$, $CaSO_4$ and $CaS$. Further alkali and alkali earth metal compounds which are well suited for the purpose of the invention are $Na_2CO_3$, NaOH, $NaNO_3$, CaO, $Ca(OH)_2$, $CaCO_3$, $MgCO_3$ and $Ca(NO_3)_2$. Sulfur in combination with at least one reagent from the group consisting of alkali and alkaline earth metals can also be supplied as elemental sulfur and sulfide ores, e.g., pyrite. Sulfur frequently present in the reducing agents used, e.g., reducing gas or fuel oil, can also serve as a source of sulfur.

Controlled metallization of the pelletized ore is achieved by establishing a tumbling bed of the pellets in a rotating reactor since more accurate control of the level of reduction can be realized by conducting the reducing operation in a tumbling bed. Avoidance of mechanical problems such as sticking or the buildup of accretions on the kiln wall as well as realization of the desired amount of reduction requires that the reduction be conducted at a temperature from about 850° C. to about 1250° C., and advantageously from about 950° C. to about 1150° C. Since it is well known that the degree of reduction of an iron-containing pellet can be controlled during direct reduction in a rotary kiln by judicious selection of temperature, retention time and composition of the gas-atmosphere in contact with the ore, the exact manner of controlling the amount of reduction does not form any part of the present invention. However, it is a feature of the present invention that the degree of reduction be so controlled that substantially all the nickel be reduced to metallic nickel and that substantially all the iron be reduced at least to FeO, but only a minor portion of the iron is reduced to metallic iron. The upper limit of the degree of reduction is controlled so that the ratio of metallic iron to metallic nickel is advantageously from about 2:1 to about 10:1. All known solid, liquid or gaseous reducing agents can be employed.

The reducing agent, for instance carbon, can be incorporated in the pellets. However, solid reducing agents, such as carbon or coke fines, can be charged either in addition to or in lieu of any reductant mechanically bound in the pellets. The reduction can be conducted in known rotary furnaces by passing the ore countercurrent to the gases generated therein. If the reduction is carried out with liquid reducing agents, such as fuel oil, it is advisable to introduce them predominantly in the lower part of the furnace, i.e., near the exit end or in the reducing zone, as disclosed in copending application Ser. No. 354,641 filed Mar. 25, 1964, and assigned to the same assignee as this application. The gaseous products generated by the thermal cracking of liquid hydrocarbons are then burned as they pass countercurrently to the charge in the part of the furnace located closer to the charging end by the introduction of combustion air to preheat the charge. One can also use a furnace which in addition to a central burner also has shell burners, i.e., burners mounted on the furnace shell, distributed over its entire length and operate the burners located in the lower part of the furnace, i.e., near the exit end, with a deficiency of air to produce a reducing atmosphere and those located closer to the charging end with at least such an excess of air that the furnace flue gas remains approximately neutral.

In order to prevent agglomeration and ringing in the furnace, lime or dolomite, preferably in a particle size of 0 to 5 mm., i.e., 90% in the range of 0.1 mm. to 5 mm., can be admixed with the furnace charge. Similarly, the pellets before being charged into the reduction furnace, for instance a rotary furnace, can be coated with powdered dolomite or lime. Furthermore, before the pellets are charged into the furnace, they can be dried and preheated in known manner by the furnace waste gases.

The partially reduced ore pellets produced in accordance with the invention, in which substantially all the nickel content is present as metal and the main part of the iron is present as iron oxide (FeO), are thereupon finely ground and subjected to a magnetic and advantageously a wet-magnetic treatment. Before the grinding they are preferably cooled to a temperature at which there is no longer any danger of reoxidation of the nickel. The cooling can be effected in any desired manner, for instance by indirect cooling. However, it is also possible to cool the pellets by spraying them with water.

In accordance with one embodiment of the invention, the partially reduced product, before or after grinding can be reoxidized in such a manner that a part of the metallic iron is again oxidized while the nickel remains substantially in metal form. This reoxidation may be carried out by treatment with mild oxidizing agents such as steam or $CO_2$, at temperatures within the range of about 500° C. to 1000° C. When the partially reduced ore is treated in this manner, even higher degrees of concentration in the magnetic concentrate are obtained than is possible without such controlled reoxidation of the partially reduced ore.

The fineness of the grinding which is necessary before the magnetic concentration depends on the degree of metal value segregation in the pellets. In general, the pellets are ground to at least about 90% less than $40\mu$.

Upon the subsequent magnetic treatment, substantially all the nickel and most of the iron present in metallic form as well as any $Fe_3O_4$ present passes into the concentrate while the main part of the iron goes into the waste as FeO or $Fe_2O_3$ together with most of the gangue, such as $SiO_2$, magnesium silicate and the like. The relatively high nickel concentration obtained in accordance with the present invention in the resultant magnetic concentrate improves the economical working of the ore into metallic nickel, nickel compounds and/or ferronickel.

The concentrate can be leached in known manner with aqueous solutions, such as carbonate-containing ammoniacal solutions, in the presence of air or other oxygen-containing gases, the leaching however, in contradistinction to known methods, being intentionally carried out in such a manner as not to obtain the highest yield of nickel but rather leaving in the leached residue a residual nickel content which corresponds approximately to the amount of nickel in the ore used in the first stage of the method. These residues are bound in the pellets together with the ore to be treated. Since in accordance with the invention only a small part of the ore to be treated must be leached, merely an aliquot portion of the amount of leaching solution heretofore necessary need be circulated. As a result of this, not only do the losses of leaching solution during the leaching and the unavoidable losses of leaching solution with the leaching residues decrease, but the apparatus required and the amount of energy required for the leaching also become smaller in the same ratio.

The same principle of intentionally not aiming at the highest yield of nickel in the treatment of the magnetic concentrate and recirculating the residues back to the ore treatment operation can also be employed when nickel in the magnetic concentrate is recovered pyrometallurgically. As preparation for the melting down of the magnetic concentrate, a prior agglomerating is advisable in order to decrease any dust losses. The agglomeration of the magnetic concentrate is advantageously effected by sintering or pelletizing under such conditions that a part of the iron present in the metallic form is oxidized while substantially all the nickel is maintained in the metallic state. The agglomerated magnetic concentrate can then be melted and if the agglomeration with subsequent sintering was conducted under oxidizing conditions the molten metal bath is enriched in nickel as the oxidized iron is slagged off. The molten metal bath can then be enriched in nickel by top blowing the molten metal bath with an oxygen-containing gas in a rotary furnace to obtain a ferronickel product containing at least about 65% nickel in accordance with the process taught in U.S. Patent No. 3,030,201.

In accordance with another embodiment of the invention, metallic iron is employed, at least in part, as a reductant. It is particularly advantageous to use for this purpose the partially metallized residues of the magnetic concentrate which remain after the leaching of the magnetic concentrate. However, a part of the magnetic concentrate itself, i.e., before the recovery of the nickel or nickel compounds therefrom, can also be employed. The addition of such a metallized magnetic concentrate is advisedly maintained at about 2% or 3% to 14% or 15% of dry ore by weight.

The method of the invention will be described in further detail below schematically by way of example on the basis of actual examples. Of these examples, Examples 1, 2 and 3 relate to partial reduction with fuel oil employing different concentration promoting and accelerating additions. Example 4 relates to reduction with gas with the use of $Na_2SO_4$ and finally Example 5 relates to reduction by means of bound-carbon also with the use of $Na_2SO_4$.

For the purpose of illustrating the present invention a lateritic nickel-containing ore as follows was employed:

| | Percent |
|---|---|
| Nickel | 1.7 |
| Iron total | 34.3 |
| $SiO_2$ | 16.9 |
| MgO | 10.4 |
| Residual moisture | 3.1 |
| Ignition loss (mainly water of crystallization) | 10.1 |

Example 1

The ore was ground in a tube mill to a fineness of 100% less than $100\mu$ and 70% less than $40\mu$. The ground ore was shaped together with 8% of its weight of finely ground $Na_2SO_4$, by spraying with water, into spherical granules of a diameter of 10 mm. to 12 mm. The finished granules had a content of hygroscopic moisture (removable at 110° C. in a drying cabinet) of 25.2%.

A heat resisting iron base alloy tube was charged with 500 grams of the dried pellets together with 75 grams of a heavy fuel oil (Bunker C oil). Nitrogen was passed through the charged tube at a rate of 20 liters (S.T.P.)/hour and the tube was introduced into a furnace which had been pre-heated to 1100° C. The tube was then turned at 1 revolution per minute and after 40 minutes the temperature of the charge was 1100° C. The charge was maintained for 2 hours at 1100° C. with continuous passage of nitrogen through the tube at a rate of 20 liters (S.T.P.)/hour. After the 2 hour period the tube was removed from the furnace and cooled over the course of 45 minutes to 50° C. by further introduction of nitrogen.

The partially reduced charge had the following analysis:

| | Percent |
|---|---|
| Total nickel | 2.1 |
| Nickel (metallic) | 2.1 |
| Iron (total) | 41.0 |
| Iron (metallic) | 8.0 |

The partially reduced pellets were comminuted to a particle size of 100% less than 2 mm. and the comminuted material was further ground in a wet bar mill to 100% less than 100μ and 93% less than 40μ.

A sample of the ground pulp was separated by the wet magnetic method in a Davis tube. The magnetic concentrate as well as the gangue was dried. The table below gives the results of the analyses of the magnetic concentrate and the gangue.

| | Ni, Percent | Total Fe, Percent | Met. Fe, Percent | $SiO_2$ Percent | MgO, Percent | $Na_2O$, Percent | S, Percent | Quantity, Percent |
|---|---|---|---|---|---|---|---|---|
| Concentrate | 15.5 | 61.8 | 44.2 | 6.2 | 4.2 | 1.0 | 0.5 | 13.2 |
| Gangue | 0.2 | 33.4 | 0.3 | 23.6 | 13.7 | 4.4 | 2.6 | 86.8 |

Calculation from the above results show that 92.1% of the nickel present in the ore reported in the magnetic concentrate.

Example 2

Pellets were made in the identical manner as described in Example 1, except that $CaSO_4.0.5H_2O$ was admixed therewith in amounts corresponding to 8% by weight of the dried pellets. These pellets were partially reduced under the same conditions as in Example 1, ground and magnetically treated. A magnetic concentrate with 8.1% nickel with an 86% nickel yield was obtained.

Example 3

From the same ore, pellets of the same particle size as in the preceding examples were prepared, 4% $Na_2SO_4$ (anhydrous) and 4.8% $NaNO_3$ was incorporated in the pellets. After reduction, grinding and magnetic treatment under the same conditions as in Examples 1 and 2, a magnetic concentrate of 9.5% nickel with 98% nickel yield was obtained.

Example 4

Ore pellets with 8% by weight $Na_2SO_4$ referred to anhydrous $Na_2SO_4$ were prepared in a pellet size of 10 mm. to 12 mm., dried and partially reduced for 2 hours in the same furnace as in the preceding examples at 1100° C. with a reducing gas with a composition corresponding to the rates of $CO:CO_2:H_2:H_2O$ equal to 15:15:35:35. After grinding and magnetic treatment there was obtained a magnetic concentrate having 11.3% nickel with an 84% nickel yield.

Example 5

Pellets having a size of 10 to 12 mm. with 8% by weight of sodium sulfate and 4% by weight lignite carbon bound therein were prepared as described in Example 1 and were partially reduced for one hour at 1100° C. without the use of any other reducing agents than the coal contained therein. After grinding and magnetic treatment, there was obtained a magnetic concentrate containing 15.8% by weight nickel with an 83% nickel yield.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for concentrating nickel values contained in lateritic ores which comprises grinding the ore to pelletizing fineness, forming pellets from the ground ore, incorporating in said pellets in concentrating amounts a sulfur-bearing material together with at least one reagent from the group consisting of alkali and alkaline earth metals, feeding the pellets to a tumbling bed heated to a temperature between about 850° C. to about 1250° C. in the presence of reducing agents to metallize the ore so that the ratio of metallic iron to metallic nickel is less than about 10:1 and magnetically separating the metallized portion of the ore to obtain a metallic concentrate containing at least about 8% nickel.

2. A process as described in claim 1 wherein the ore is ground to a fineness of at least about 50% less than 40 microns.

3. A process as described in claim 1 wherein said reagent from the group consisting of alkali and alkaline earth metals is added in molar equivalents of sodium oxide which is incorporated in the pellets at a rate of about 1% to about 7% of the dry weight of the ore.

4. A process as described in claim 1 wherein said sulfur-bearing material together with said reagent from the group consisting of alkali and alkaline earth metals are added in proportion such that the ratio of the molar equivalent of said reagent to said sulfur-bearing material is from about 1:1 to about 4:1.

5. A process as described in claim 1 wherein the ratio of metallic iron to metallic nickel after reduction is from about 2:1 to about 10:1.

6. A process as described in claim 1 wherein said sulfur-bearing material and said reagent are incorporated in the ore before pelletizing.

7. A process as described in claim 1 wherein said sulfur-bearing material and said reagent are incorporated in said pellets by soaking said pellets in an aqueous solution containing said sulfur-bearing material and said reagent.

8. A process as described in claim 1 wherein said sulfur-bearing material and said reagent are incorporated in said pellets as sodium sulfate.

9. A process as described in claim 1 wherein said sulfur-bearing material is added during reduction from the sulfur content of said reducing agents.

10. A process as described in claim 1 wherein the reduced pellets are ground to a particle size of at least about 90% less than 40 microns before magnetically separating the nickel concentrate.

11. A process according to claim 1 wherein the material and the reagent is added as a compound selected from the group consisting of the sulfates and sulfides of a metal from the group consisting of the alkali and alkaline earth metals.

12. A process as described in claim 1 wherein the temperature of the tumbling bed of pellets is maintained between about 950° C. and about 1150° C.

13. A process as described in claim 1 wherein said sulfur-bearing material and said reagent are incorporated in said pellets as calcium sulfate.

14. A process as described in claim 1 wherein the temperature of the tumbling bed of pellets is maintained at about 1100° C.

References Cited

UNITED STATES PATENTS

| | | | |
|---|---|---|---|
| 1,717,160 | 6/1929 | Kichline | 75—21 |
| 2,353,613 | 7/1944 | Gardner | 209—3 |
| 2,855,290 | 10/1958 | Freeman | 75—33 |

HARRISON L. HINSON, *Primary Examiner.*